(12) United States Patent
Takatsu et al.

(10) Patent No.: US 7,937,544 B2
(45) Date of Patent: May 3, 2011

(54) APPARATUS, METHOD AND COMPUTER PRODUCT FOR DATA BACKUP AND SYNCHRONIZATION

(75) Inventors: Kazuma Takatsu, Kawasaki (JP); Motohiro Sakai, Kawasaki (JP); Akira Satou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 231 days.

(21) Appl. No.: 11/603,126

(22) Filed: Nov. 22, 2006

(65) Prior Publication Data

US 2008/0022056 A1 Jan. 24, 2008

(30) Foreign Application Priority Data

Jul. 20, 2006 (JP) ................................. 2006-198625

(51) Int. Cl.
*G06F 12/16* (2006.01)
(52) U.S. Cl. ........................................ 711/161; 711/162
(58) Field of Classification Search ........................ None
See application file for complete search history.

(56) References Cited

U.S. PATENT DOCUMENTS

| | | | |
|---|---|---|---|
| 7,318,134 B1 * | 1/2008 | Oliveira et al. ............... | 711/162 |
| 2005/0262316 A1 | 11/2005 | Obayashi et al. | |
| 2006/0026459 A1 * | 2/2006 | Otsuka et al. ..................... | 714/6 |
| 2006/0064441 A1 * | 3/2006 | Yamamoto ..................... | 707/201 |
| 2007/0022263 A1 * | 1/2007 | Fandel et al. .................. | 711/162 |
| 2007/0198604 A1 * | 8/2007 | Okada et al. ................... | 707/202 |

FOREIGN PATENT DOCUMENTS

| | | |
|---|---|---|
| JP | 11-120057 | 4/1999 |
| JP | 2001-100931 | 4/2001 |
| JP | 2005-332067 | 12/2005 |

OTHER PUBLICATIONS

Japanese Office Action issued Mar. 1, 2011 in corresponding Japanese Patent Application 2006-198625.

* cited by examiner

*Primary Examiner* — Than Nguyen
(74) *Attorney, Agent, or Firm* — Staas & Halsey LLP

(57) ABSTRACT

In a data recording apparatus, a monitoring unit detects a VLU including an MRB that manages an area that has not been accessed for a specified time period based on a current time, a time management table, and a parameter table. From MRBs of the detected VLU, the monitoring unit selects a plurality of MRBs with an unaccessed time period equal to or more than the specified time period and equal to or less than a total time. The monitoring unit performs synchronization process for data in a primary storage managed by the selected MRBs at a time. During the synchronization process, a correction value is adjusted when there is a data conflict with another device.

9 Claims, 5 Drawing Sheets

TIME MANAGEMENT TABLE 150a

| VLU IDENTIFICATION INFORMATION | MRB IDENTIFICATION INFORMATION | LAST ACCESS TIME |
|---|---|---|
| VLU 0 | MRB0 | 17:00 |
| | MRB6 | 17:05 |
| | MRB11 | 17:10 |
| | MRB16 | 17:15 |
| | MRB21 | 17:21 |
| VLU 1 | MRB2 | 17:01 |
| | MRB7 | 17:06 |
| | MRB12 | 17:11 |
| | MRB17 | 17:16 |
| | MRB22 | 17:22 |
| VLU 2 | MRB3 | 17:02 |
| | MRB8 | 17:07 |
| | MRB13 | 17:12 |
| | MRB18 | 17:18 |
| | MRB23 | 17:23 |
| VLU 3 | MRB4 | 17:03 |
| | MRB9 | 17:08 |
| | MRB14 | 17:13 |
| | MRB19 | 17:19 |
| | MRB24 | 17:24 |
| VLU 4 | MRB5 | 17:04 |
| | MRB10 | 17:09 |
| | MRB15 | 17:14 |
| | MRB20 | 17:20 |
| | MRB25 | 17:25 |

FIG.4

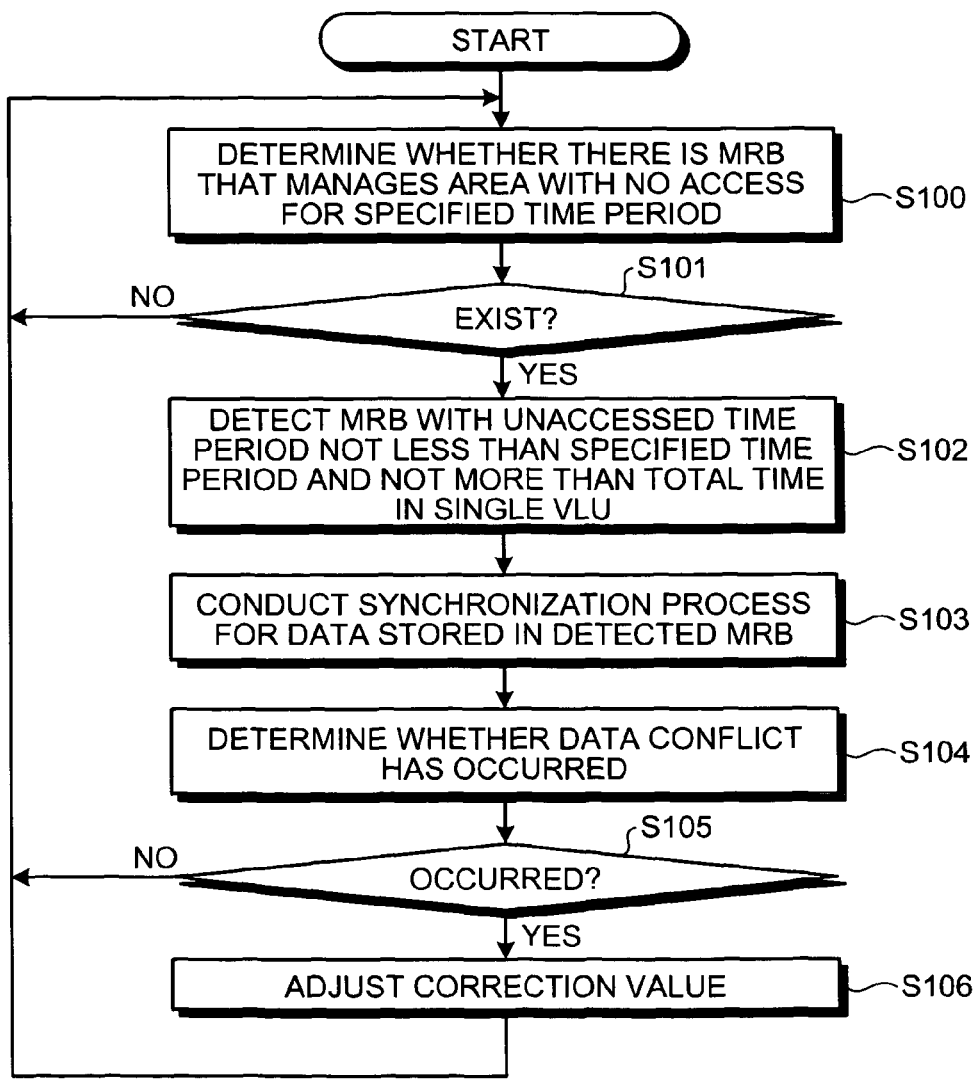

PARAMETER TABLE 150b

| SPECIFIED TIME PERIOD | 60 MINUTES |
|---|---|
| CORRECTION VALUE | 30% |
| SYNCHRONIZATION SCHEDULE NUMBER | 10 |

FIG.5

START

S100: DETERMINE WHETHER THERE IS MRB THAT MANAGES AREA WITH NO ACCESS FOR SPECIFIED TIME PERIOD

S101: EXIST?
NO → (loop back)
YES ↓

S102: DETECT MRB WITH UNACCESSED TIME PERIOD NOT LESS THAN SPECIFIED TIME PERIOD AND NOT MORE THAN TOTAL TIME IN SINGLE VLU

S103: CONDUCT SYNCHRONIZATION PROCESS FOR DATA STORED IN DETECTED MRB

S104: DETERMINE WHETHER DATA CONFLICT HAS OCCURRED

S105: OCCURRED?
NO → (loop back)
YES ↓

S106: ADJUST CORRECTION VALUE

APPARATUS, METHOD AND COMPUTER PRODUCT FOR DATA BACKUP AND SYNCHRONIZATION

CROSS REFERENCE TO RELATED APPLICATION

This application claims the benefit under 35 U.S.C. Section 119 of Japanese Patent Application No. 2006-198625, filed Jul. 20, 2006, which is hereby incorporated by reference in its entirety into this application.

BACKGROUND OF THE INVENTION

1. Field of the Invention

The present invention relates to a technology for backing up data stored in a primary storage into a secondary storage.

2. Description of the Related Art

A storage system that includes a primary storage (redundant arrays of inexpensive disk (RAID), etc.) and a secondary storage (a tape device, etc.) has a function of copying data to the second storage when the data has not been updated for a specified time period in the primary storage. For example, Japanese Patent Application Laid-open No. 2001-100931 discloses a storage system having such a function.

The conventional storage system records the time of the data update per specific data unit (MRB <Migration/Recall Block>) to check elapsed time since data was stored in the primary storage. The storage system performs a synchronization process (process of copying data from the primary storage to the secondary storage) based on the MRB.

Besides, a storage system with global file system (GFS) environment has a function of managing a plurality of logical unit numbers (LUN) as one LUN in the primary storage that can be seen from the host computer to reduce the burden on the host computer or the like.

FIG. 7 is a schematic for explaining functions of a conventional storage system. The conventional storage system with the GFS environment manages virtual logical units (VLUs) VLU 0 to 4 as one LUN. Data are updated for the LUN in order while the VLUs are switched in a specific range. In the example of FIG. 7, data update time is the oldest in MRB (1), and is newer in order of MRB (2), MRB (3), and MRB (4).

In the conventional storage system, tape devices are assigned to the VLUs, respectively, and therefore, the synchronization process is performed while the tape devices are switched each time the VLUs are switched. For example, in FIG. 7, VLU 0 switches to VLU 1 when the subject of the synchronization process switches from MRB (1) to MRB (2). Accordingly, the synchronization process is performed by switching a tape device corresponding to VLU 0 to a tape device corresponding to VLU 1.

In the conventional storage system, however, the tape devices are assigned to the VLU, respectively, and switching of the tape devices frequently occurs in the synchronization process. As a result, performance of the secondary storage is deteriorated and its life span is reduced.

SUMMARY OF THE INVENTION

It is an object of the present invention to at least partially solve the problems in the conventional technology.

According to an aspect of the present invention, a data recording apparatus that transfers data stored in a primary storage that includes a storage device with separate memory areas to a secondary storage, includes a detecting unit that detects, from the primary storage, a storage device with a memory area that has not been accessed for a predetermined time period after data recording, and a recording unit that selects a plurality of memory areas from detected storage device based on the predetermined time period, and stores data present in selected memory areas in the secondary storage.

According to another aspect of the present invention, a data recording method for transferring data stored in a primary storage including a storage device with separate memory areas to a secondary storage, includes detecting, from the primary storage, a storage device with a memory area that has not been accessed for a predetermined time period after data recording, selecting a plurality of memory areas from detected storage device based on the predetermined time period, and storing data present in selected memory areas in the secondary storage.

According to still another aspect of the present invention, a computer-readable recording medium stores therein a computer program that causes a computer to implement the above methods.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is one example of a data structure of a parameter table shown in FIG. 2;

FIG. 5 is a flowchart of the operation of a monitoring unit shown in FIG. 2;

DETAILED DESCRIPTION OF THE PREFERRED EMBODIMENTS

Exemplary embodiments of the present invention are explained below in detail with reference to the accompanying drawings.

Figure 1:
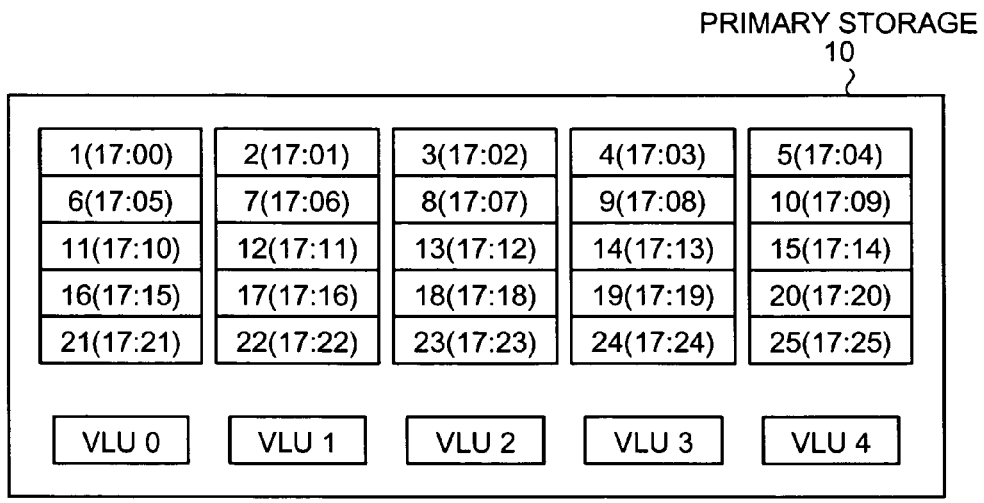
FIG. 1 is a schematic for explaining differences between a data recording apparatus according to an embodiment of the present invention and that of a conventional technology.

FIG. 1 is a schematic for explaining differences between a data recording apparatus according to an embodiment of the present invention and that of a conventional technology. An outline and features of the data recording apparatus are described first. A primary storage 10 includes a plurality of VLUs each having a plurality of memory areas identified by MRBs.

When a GFS in a host computer integrates and manages the VLUs as one LUN, data are stored while the VLUs in the primary storage 10 are switched. In FIG. 1, the number in brackets is the time at which the data is stored. That is, data received from the host computer are allocated to MRB 1, MRB 2, . . . , and MRB 25 and stored in this order at 17:00, 17:01, . . . , and 17:25, respectively.

According to the conventional technology, a time period to perform a synchronization process (process of copying data from a primary storage to a secondary storage) is specified, and the synchronization process is performed sequentially from data in a memory area which is not accessed for the specified time period. For example, when the specified time period is 60 minutes, data stored in an area of the primary storage managed by MRB 1 of VLU 0 is stored in a tape device (secondary storage) corresponding to VLU 0 at 18:00. Similarly, data stored in an area managed by MRB 2 of VLU 1 is stored in a tape device corresponding to VLU 1 at 18:01. In the same manner as above, the data synchronization process is performed with respect to MRB 3 to MRB 25 in this order while tape devices are switched.

However, in the conventional technology, the VLUs are frequently switched during the synchronization process, and along with this, tape devices (secondary storage) are also switched. As a result, performance of the secondary storage is deteriorated and its life span is reduced.

Therefore, the data recording apparatus of the embodiment stores data collectively in the secondary storage from areas managed by the MRBs of the VLUs of the primary storage 10. Specifically, the data recording apparatus presets a correction value and selects a plurality of MRBs that are subjected to the synchronization process from a single VLU based on a specified time period and the correction value. Thus, the data recording apparatus stores data at a time in the same tape device (secondary storage) from areas managed by the selected MRBs.

The data recording apparatus first selects a VLU with a memory area that stores data which in not accessed for the specified time period. The data recording apparatus then calculates a total time, i.e., the sum of the specified time period and a correction time obtained by multiplying the specified time period by the correction value. From the MRBs of the selected VLU, the data recording apparatus selects MRBs with a time period for which there is no access thereto (hereinafter, "unaccessed time period") equal to or more than the specified time period and equal to or less than the total time, and stores data in the tape device from areas managed by the MRBs.

For example, when the specified time period is 60 minutes and the correction value is 30% (0.3), the correction time is 18 (60×0.3=18) minutes, and the total time is 78 minutes. In the example of FIG. 1, VLU 0 is selected at 18:00, and MRB 1, MRB 6, MRB 11 and MRB 16, each with an unaccessed time period equal to or more than the specified time period and equal to or less than the total time, are selected. Data stored in areas managed by the selected MRBs are then collectively stored in the secondary storage.

As described above, the data recording apparatus of the embodiment stores data collectively in the secondary storage from areas managed by the MRBs of the VLU, which significantly reduces the number of times tape devices are switched. Thus, it is possible to prevent deterioration in the performance of the secondary storage and a reduction in its life span.

Figure 2:
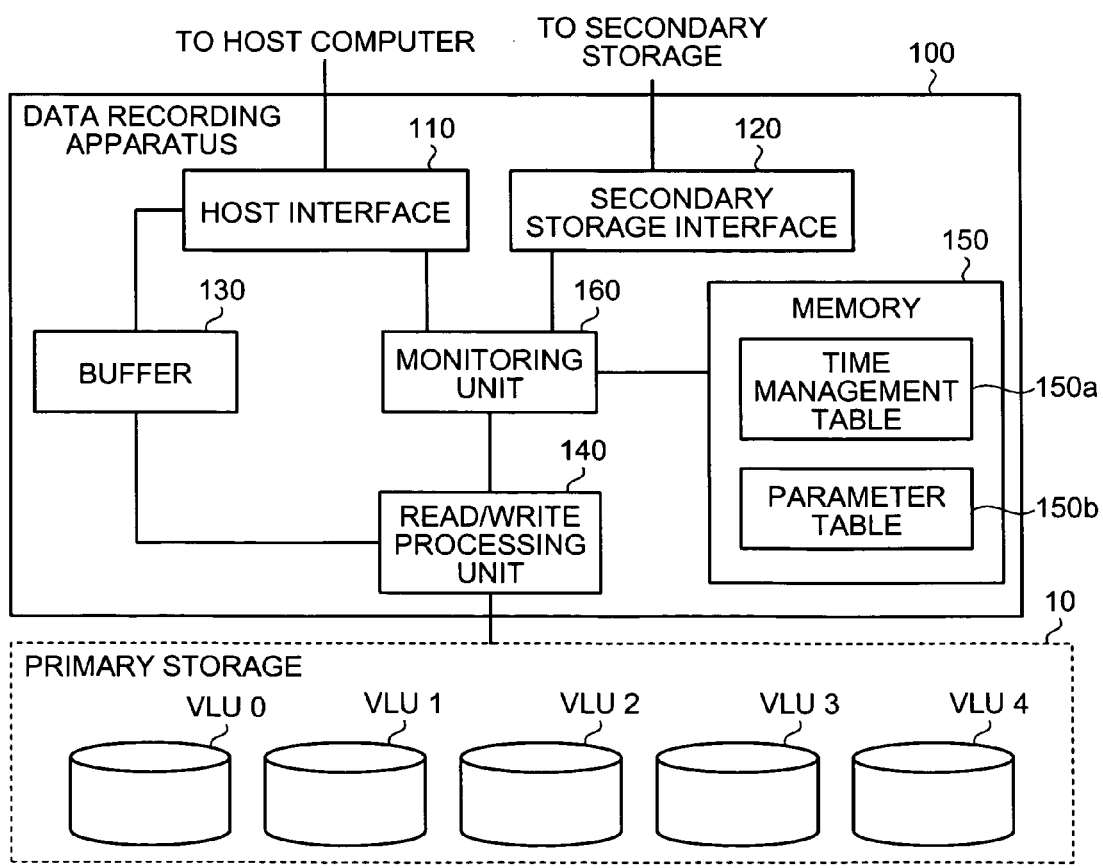
FIG. 2 is a functional block diagram of the data recording apparatus.

FIG. 2 is a block diagram of a data recording apparatus 100 according to an embodiment of the present invention. The data recording apparatus 100 includes a host interface 110, a secondary storage interface 120, a buffer 130, a read/write processing unit 140, a memory 150, and a monitoring unit 160.

The host interface 110 controls data transmission and reception to and from a host computer (not shown). The secondary storage interface 120 controls data transmission and reception to and from a secondary storage (not shown) such as a tape device. It is assumed that the secondary storage includes a plurality of tape devices that are associated with VLUs 0 to 4 of the primary storage 10, respectively.

The buffer 130 temporarily stores data output from the host computer or data output to the host computer. The read/write processing unit 140 reads and writes data from and to the primary storage 10.

The memory 150 stores various data, and includes a time management table 150a and a parameter table 150b. The time management table 150a manages the last access time of data stored in areas managed by the MRBs of each VLU in the primary storage 10.

Figure 3:
FIG. 3 is one example of a data structure of a time management table shown in FIG. 2.

FIG. 3 is one example of a data structure of the time management table 150a. The time management table 150a contains VLU identification information, MRB identification information, and the last access time. In the example of FIG. 3, the time management table 150a indicates that data stored in an area managed by MRB 1 of VLU 0 was last accessed at 17:00. The last access time in the time management table 150a is updated every time the host computer accesses data stored in an area managed by each MRB.

The parameter table 150b stores therein various data to determine MRBs that are to be subjected to the synchronization process. FIG. 4 is one example of a data structure of the parameter table 150b. The parameter table 150b contains such information as a specified time period, a correction value, and a synchronization schedule number. The synchronization schedule number indicates the maximum number of MRBs selected at a time.

The monitoring unit 160 updates the time management table 150a in response to an access to the primary storage 10. The monitoring unit 160 also selects MRBs that are to be subjected to the synchronization process based on the time management table 150a and the parameter table 150b, and performs the synchronization process for data stored in areas managed by the selected MRBs.

Specifically, the monitoring unit 160 first compares the last access time stored in the time management table 150a, the specified time period in the parameter table 150b, and the current time, and detects a VLU having an MRB with the last access time since which the specified time period has passed. The monitoring unit 160 then adds the specified time period to a correction time obtained by multiplying the specified time period by the correction value, thereby calculating a total time. From the detected VLU, the monitoring unit 160 selects an MRB with an unaccessed time period equal to or more than the specified time period and equal to or less than the total time, and performs the synchronization process for data in an area managed by the selected MRB.

When the number of selected MRBs exceeds the synchronization schedule number in the parameter table 150b, the monitoring unit 160 reduces the number of the MRBs to be subjected to the synchronization process by the number exceeding the synchronization schedule number from a low priority MRB. Higher priority is assigned to an MRB with the older (less recent) last access time.

When performing the synchronization process, the monitoring unit 160 determines whether there is a conflict with another device (e.g., host computer) with respect to data to be subjected to the synchronization process. Having determined that there is a conflict with another device with respect to the data, the monitoring unit 160 adjusts the correction value stored in the parameter table 150b (subtracts a predetermined value from the correction value). For example, the monitoring unit 160 changes the correction value from 30% to 20%.

FIG. 5 is a flowchart of the operation of the monitoring unit 160. First, the monitoring unit 160 determines whether there is an MRB that manages an area that has not been accessed for the specified time period based on the current time, the time management table 150a, and the parameter table 150b (step S100). When there is no such an MRB (No at step S101), the process returns to step S100. If any (Yes at step S101), the monitoring unit 160 detects an MRB in a single VLU with an unaccessed time period equal to or more than the specified time period and equal to or less than the total time (step S102). The monitoring unit 160 performs the synchronization process for data stored in an area managed by the detected MRB (step S103). When the number of MRBs detected at step S102 exceeds the synchronization schedule number, the monitoring unit 160 reduces the number of the MRBs to not more than the synchronization schedule number from the lowest priority MRB, so that the synchronization process is not performed for data stored in an area managed by an excess MRB.

The monitoring unit 160 then determines whether there is a conflict with respect to the data (step S104). When there is no conflict with respect to the data (No at step S105), the process returns to step S100. When there is a conflict (Yes at step S105), the monitoring unit 160 adjusts the correction value in the parameter table 150b (step S106). Then, the process returns to step S100.

As described above, the monitoring unit 160 selects a plurality of MRBs that are to be subjected to the synchronization process from a single VLU based on the current time, the time management table 150a and the parameter table 150b, and performs the synchronization process collectively for the MRBs. Thus, it is possible to prevent deterioration in the performance of the secondary storage and a reduction in its life span.

Specifically, in the data recording apparatus 100 according to the embodiment, the monitoring unit 160 detects a VLU having an MRB with the last access time since which the specified time period has passed based on the current time, the last access time in the time management table 150a, and the parameter table 150b. The monitoring unit 160 then selects a plurality of MRBs with an unaccessed time period equal to or more than the specified time period and equal to or less than the total time from the detected VLU. The monitoring unit 160 performs the synchronization process collectively for areas managed by the selected MRBs, which significantly reduces the number of times tape devices are switched. Thus, it is possible to prevent deterioration in the performance of the secondary storage and a reduction in its life span.

Moreover, the data recording apparatus 100 sets the synchronization schedule number to limit the number of MRBs for which the synchronization process is performed at a time. Thus, data conflict that may occur with another device (host computer, etc.) during the synchronization process can be prevented.

Furthermore, the data recording apparatus 100 adjusts the correction value when there is a data conflict with another device (host computer, etc.) during the synchronization process. Therefore, a data conflict can be prevented from the next synchronization process.

The data recording apparatus 100 is explained above as hardware; however, it can be implemented as software. In other words, a computer program can be executed on a computer to realize the same function as the data recording apparatus 100. In the following, such a computer is explained.

Figure 6:
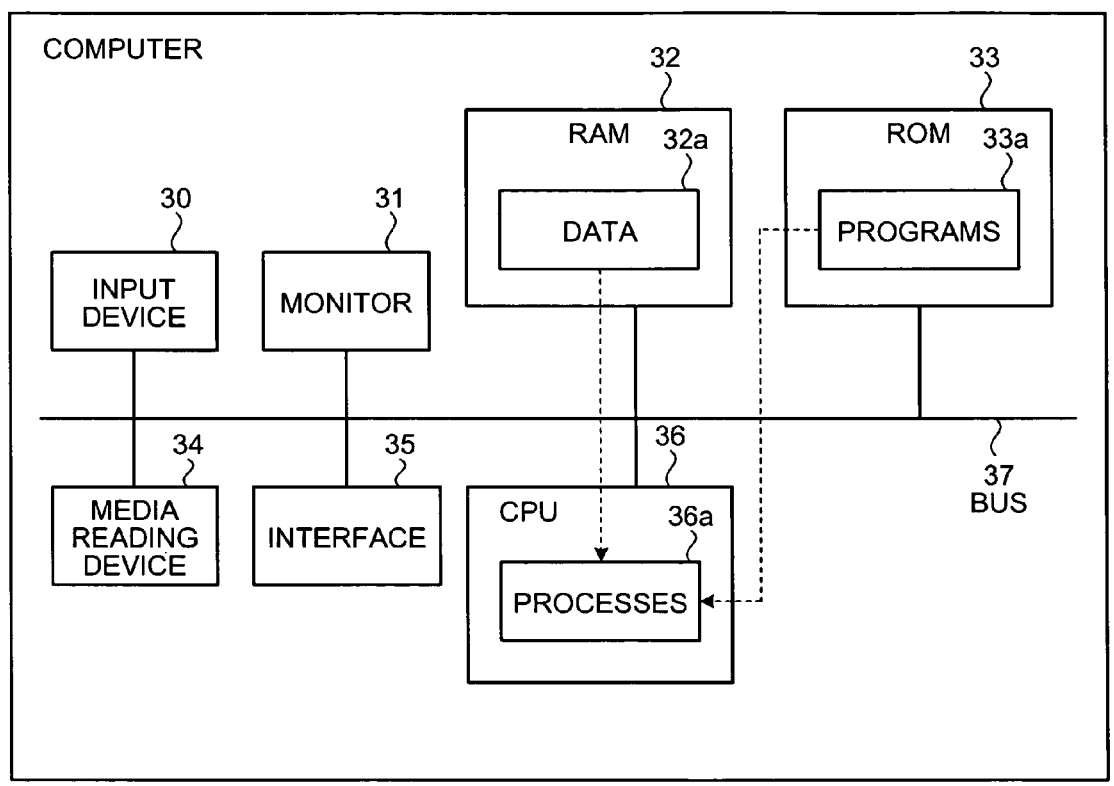
FIG. 6 is a block diagram of a computer that implements the data recording apparatus.
Figure 7:
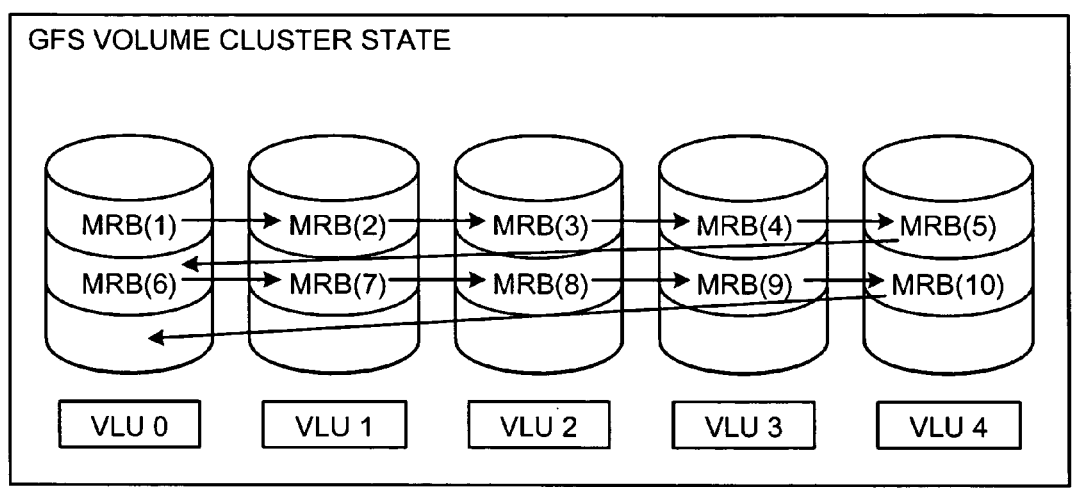
FIG. 7 is a schematic for explaining a function of a conventional storage system.

FIG. 6 is a block diagram of a computer that implements the data recording apparatus 100. The computer includes an input device 30 that accepts data input from a user, a monitor 31, a random access memory (RAM) 32, a read only memory (ROM) 33, a media reading device 34 that reads a program from a recording medium storing various programs, an interface 35 that transmits and receives data to and from other computers, and a central processing unit (CPU) 36 connecting, which are connected with a bus 37.

The ROM 33 stores therein various programs 33a that implements the same function as the data recording apparatus 100. The CPU 36 loads the programs 33a from the ROM 33 to execute, and various processes 36a that realize the same function as the data recording apparatus 100 are activated.

The RAM 32 stores therein various data 32a corresponding to data stored in the memory 150 of the data recording apparatus 100. The CPU 36 stores the data 32a received from the host computer or the input device 30 in the RAM 32, and performs data processing based on the data 32a stored in the RAM 32.

The programs 33a are not necessarily stored in the ROM 33 from beginning. For example, the programs 33a can be stored in a portable physical medium, such as a flexible disk (FD), a compact disc-read only memory (CD-ROM), a digital versatile disk (DVD), a magneto-optical disk, and an integrated circuit (IC) card, inserted into a computer, or in a fixed physical medium such as a hard disk drive (HDD) that is provided inside and outside the computer. The programs 33a can be downloaded from another computer (or a server) that is connected to the computer through a public line, the Internet, a local area network (LAN), a wide area network (WAN) or the like, and executed by the computer.

Of the processes described in the embodiment, all or a part of the process described as being performed automatically can be performed manually, or all or a part of the process described as being performed manually can be performed automatically with a known method.

The process procedures, control procedures, specific names, information including various data and parameters mentioned in the above description and the drawings can be arbitrarily changed unless otherwise stated.

The constituent elements of the devices in the drawings are functionally conceptual, and need not necessarily be physically configured as illustrated. That is, the arrangement of the respective devices is not limited to that shown in the drawings, and can be functionally or physically separated or integrated, partly or wholly, according to the load or usage.

The same function of the respective devices can be entirely or partially realized by CPU or a computer program executed by CPU. The respective devices can also be implemented in wired-logic hardware.

As set forth hereinabove, according to an embodiment of the present invention, a storage device is detected from the primary storage which has memory areas that have not been accessed for a specified time period since data recording. Then, a plurality of memory areas are selected from the detected storage device based on the specified time period, and data in the selected memory areas are stored in the secondary storage. Thus, it is possible to prevent deterioration in the performance of the secondary storage and a reduction in its life span due to backup procedures.

The memory areas are selected from a single storage device when there is no access thereto for a time period not less than the specified time period and not more than a total time: the sum of the specified time period and a time period obtained by multiplying the specified time period by a predetermined ratio. Then, data in the memory areas are stored in the secondary storage, which enables efficient backup.

Moreover, a determination is made as to whether there is a data conflict with another device when the data in the memory areas are stored in the secondary storage. The total time is adjusted when there is a data conflict with another device. In addition, the number of the selected memory areas is equal to or less than a specified number. Thus, a data conflict can be prevented.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data recording apparatus that transfers data stored in a first storage including a storage device with separate memory areas to a second storage, the data recording apparatus comprising:
   a detecting unit that detects, from the first storage, a storage device with a memory area that has not been accessed for a predetermined time period after data recording; and
   a recording unit that selects a plurality of memory areas from the detected storage device based on the predetermined time period, and stores data present in the selected memory areas in the second storage,
   wherein the recording unit calculates a sum of the predetermined time period and a time period obtained by multiplying the predetermined time period by a predetermined ratio as a total time, selects from the detected storage device a memory area with no access after data recording for a time period not less than the predetermined time period and not more than the total time, and stores data present in the selected memory area in the second storage.

2. The data recording apparatus according to claim 1, further comprising:
   a determining unit that determines, upon the recording unit storing the data in the second storage, whether there is a conflict with another device with respect to the data; and
   an adjusting unit that adjusts the total time when there is a conflict with another device.

3. The data recording apparatus according to claim 1, wherein number of the selected memory areas is equal to or less than a predetermined number.

4. A computer-readable recording medium that stores therein a computer program that causes a computer to transfer data stored in a first storage including a storage device with separate memory areas to a second storage, the computer program causing the computer to execute:
   detecting, from the first storage, a storage device with a memory area that has not been accessed for a predetermined time period after data recording;
   selecting a plurality of memory areas from the detected storage device based on the predetermined time period; and
   storing data present in the selected memory areas in the second storage,
   wherein the selecting includes
      calculating a sum of the predetermined time period and a time period obtained by multiplying the predetermined time period by a predetermined ratio as a total time; and
      selecting, from the detected storage device, a memory area with no access after data recording for a time period not less than the predetermined time period and not more than the total time.

5. The computer-readable recording medium according to claim 4, wherein the computer program further causes the computer to execute:
   determining, upon storing the data in the second storage, whether there is a conflict with another device with respect to the data; and
   adjusting the total time when there is a conflict with another device.

6. The computer-readable recording medium according to claim 4, wherein the number of the selected memory areas is equal to or less than a predetermined number.

7. A data recording method for transferring data stored in a first storage including a storage device with separate memory areas to a second storage, the data recording method comprising:
   detecting, from the first storage, a storage device with a memory area that has not been accessed for a predetermined time period after data recording;
   selecting a plurality of memory areas from the detected storage device based on the predetermined time period; and
   storing data present in the selected memory areas in the second storage,
   wherein the selecting includes
      calculating a sum of the predetermined time period and a time period obtained by multiplying the predetermined time period by a predetermined ratio as a total time; and
      selecting, from the detected storage device, a memory area with no access after data recording for a time period not less than the predetermined time period and not more than the total time.

8. The data recording method according to claim 7, further comprising:
   determining, upon storing the data in the second storage, whether there is a conflict with another device with respect to the data; and
   adjusting the total time when there is a conflict with another device.

9. The data recording method according to claim 7, wherein the number of the selected memory areas is equal to or less than a predetermined number.

* * * * *